United States Patent [19]

Newman et al.

[11] 4,034,843

[45] July 12, 1977

[54] SPLIT CORRECTION RIBBON AND METHOD

[75] Inventors: Douglas A. Newman; Albert E. Brown; Allan T. Schlotzhauer, all of Glen Cove, N.Y.

[73] Assignee: Columbia Ribbon and Carbon Manufacturing Co., Inc., Glen Cove, N.Y.

[21] Appl. No.: 575,819

[22] Filed: May 8, 1975

Related U.S. Application Data

[63] Continuation-in-part of Ser. No. 526,127, Nov. 22, 1974, Pat. No. 3,924,728.

[51] Int. Cl.² ...................... B32B 7/02; B32B 7/12; B41J 31/05; C09J 7/02

[52] U.S. Cl. ................................ 197/172; 156/309; 197/181; 428/57; 428/189; 428/216; 428/352; 428/354; 428/914

[58] Field of Search ............ 428/57, 189, 190, 191, 428/192, 343, 216, 352, 354, 914; 197/172, 181; 427/146; 156/309

[56] References Cited

U.S. PATENT DOCUMENTS

| | | | |
|---|---|---|---|
| 1,183,424 | 5/1916 | Baldwin | 197/172 |
| 2,909,442 | 10/1959 | Persoon | 428/354 |
| 3,143,200 | 8/1964 | Gutman | 197/172 |
| 3,148,468 | 9/1964 | Vander Weel | 428/189 |
| 3,461,998 | 8/1969 | Ploeger | 197/181 |
| 3,617,328 | 11/1971 | Newman | 428/914 |
| 3,664,869 | 5/1972 | Sala | 197/181 |
| 3,684,544 | 8/1972 | Piron | 427/146 |
| 3,724,633 | 4/1973 | Korb et al. | 197/181 |
| 3,752,291 | 8/1973 | Barouh et al. | 197/181 |
| 3,825,104 | 7/1974 | Wolowitz | 197/181 |
| 3,896,920 | 7/1975 | Barouh et al. | 197/181 |
| 3,924,728 | 12/1975 | Brown et al. | 197/181 |

FOREIGN PATENT DOCUMENTS

| | | | |
|---|---|---|---|
| 1,261,134 | 10/1963 | Germany | 197/172 |

OTHER PUBLICATIONS

IBM Technical Disclosure Bulletin, vol. 13, No. 11, Apr. 1971, p. 3460.

*Primary Examiner*—J.C. Cannon
*Attorney, Agent, or Firm*—Thomas L. Tully

[57] ABSTRACT

A split correction-imaging ribbon comprising a longitudinal strip of film-base adhesive correction composition and an adjacent longitudinal strip of film-base pressure-transferable imaging composition. The two strips are overlapped and bonded together by means of the adhesive correction composition to provide a unitary element such as a typewriter ribbon which is bifunctional, i.e. capable of producing typed images on a copy sheet and also capable of removing such typed images as may be erroneous.

10 Claims, 2 Drawing Figures

SPLIT CORRECTION RIBBON AND METHOD

This application is a continuation-in-part of prior application Ser. No. 526,127, filed Nov. 22, 1974 now U.S. Pat. No. 3,924,728, issued Dec. 9, 1975.

It is known to produce split correction-imaging ribbons based upon imaging compositions and correction compositions, both of which are pressure-transferable. The correction compositions function by overlying and masking the erroneous images and are effective in connection with imaging compositions of all types. A variety of techniques and a variety of materials have been used to produce such known ribbons. The most obvious method, namely the application of adjacent stripes of correction composition and imaging composition to a common foundation, has been found to be impractical because of the difficulty of printing thin adjacent stripes of different compositions onto a common support, which stripes require different coating techniques, thicknesses, drying conditions and/or solvents and must not become integrated with each other during application.

It has been proposed to avoid these problems by separately preparing the correction element and the imaging element, each with its own support, and thereafter uniting them to form a unitary element. According to one proposal, a fabric is impregnated with a liquid ink to provide the imaging strip but it has been found to be very difficult and expensive to unite such a fabric strip with a strip of masking composition. It has also been proposed to produce strips of masking composition and of imaging composition, each having its own plastic film foundation, and to adhere such strips to another plastic film foundation to form a common support. The main disadvantage of this proposal is that it results in the production of an element having such a thick composite foundation, comprising two plastic films and an intermediate layer of adhesive, that the imaging layer is not capable of producing typed images having the required degree of sharpness.

Copending application, Ser. No. 526,127, filed Nov. 22, 1974, relates to a novel image-correction system employing novel pressure-adhesive correction compositions and corresponding resin-base imaging compositions which are capable of being removed cleanly from a copy sheet by means of the correction composition under the effects of typing pressure. Said application also discloses a split correction-imaging ribbon comprising a common foundation coated with adjacent stripes of the correction and imaging compositions. As mentioned supra, it is extremely difficult to produce split ribbons in this manner, and it is the principal object of the present invention to provide a relatively simple and effective method for producing split adhesive correction-frangible imaging ribbons based upon compositions of the type disclosed in said copending application.

It is another object of this invention to provide novel split correction-imaging ribbons in which the imaging and correction strips are independently produced using foundations and coating thicknesses which permit the respective strips to carry out their function in the most effective manner.

It is yet another object of the present invention to unite individual longitudinal strips of supported imaging and correction composition without increasing the thickness of the support for either of the compositions in the area which is contacted by the printing element, such as a type bar.

These and other objects and advantages of the present invention will be apparent to those skilled in the art in the light of the present disclosure including the drawing, in which.

Figure 1:
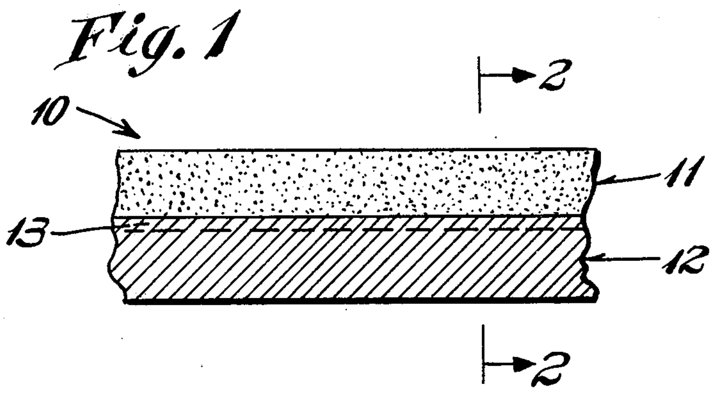
FIG. 1 is a plan view of a segmented split imaging-correction ribbon produced according to the present invention.

Referring to the drawing, the present split ribbons 10 comprise a longitudinal latent adhesive correction strip 11 and a longitudinal correctable imaging strip 12 which are bonded together along an overlap central area 13 by means of pressure-activated portions 16 of latent adhesive layer 15 to provide a unitary bifunctional ribbon. The correction strip 11 has a flexible foundation 14 supporting a layer 15 of latent pressure-adhesive, non-transferable composition while the imaging strip 12 has a flexible foundation 17 supporting the layer 18 of pressure-transferable imaging composition.

The objects and advantages of the present invention are accomplished by the discovery that the pressure-adhesive properties of the present correction materials, which enable such materials to carry out the correction operation, can also be taken advantage of in connection with the uniting of the correction strip to the imaging strip to form a bifunctional ribbon. The combination of the latent adhesive correction strip 11 and the imaging strip 12 as a unitary element is important because the latent adhesive correction strip is not operative in connection with many imaging compositions, such as fabric ribbon inks and wax carbon paper compositions, but requires special dry frangible imaging compositions comprising synthetic resin binder material and coloring matter of the type present on the joined imaging strip.

The compositions and methods suitable for the preparation of the latent adhesive correction strips 11 and the imaging composition strips 12 of the present bifunctional ribbons are set forth in copending application, Ser. No. 526,127, filed Nov. 22, 1974, the disclosure of which is hereby incorporated by reference.

The most critical feature of the correction composition is its latent adhesive property. Thus the layer of correction composition has an exposed surface which is substantially non-sticky and non-adhesive at ambient room temperatures until the layer is subjected to imaging pressure such as typing pressure. Thus the layer 15 of correction composition comprises a pressure flowable adhesive resin and a non-adhesive surface material which provides the layer with a non-sticky, non-adhesive upper surface, permitting the ribbon to be wound on a spool in the same manner and under the same tension as a conventional typewriter ribbon without the surface of layer 15 sticking to the rear surface of the support 14 or sticking to and causing transfer of any portion of the layer 18 of imaging composition which may come into contact therewith. This property is particularly important in connection with the present split ribbons because the top surface of layer 18 of imaging composition is non-sticky and non-adhesive, and any substantial differential between the ability of layer 15 or layer 18 to stick to the undersurface of their respective foundations 14 and 17 when the ribbon is unwound from a spool could lead to breakage of the ribbon, uneven winding on the take-up spool, snagging in the ribbon guides, and other related problems.

Figure 2:
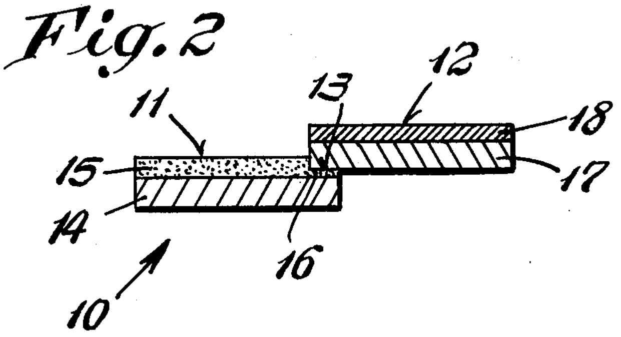
FIG. 2 is a diagrammatic cross-section, to an enlarged scale, of a split imaging-correction ribbon taken along the line 2—2 of FIG. 1.

A variety of methods may be employed to cause the strip 11 of correction material to adhere to the strip 12 of imaging composition along an overlap central area 13, as illustrated by FIG. 2. Basically such methods involve the step of applying sufficient pressure to said overlap area 13 to cause a marginal stripe 16 of the layer 15 of latent adhesive material to become adhesive while in contact with a corresponding marginal stripe of the undersurface of the foundation 17 of the imaging strip 12, whereby the marginal stripe 16 becomes impressed, as shown in FIG. 2, and forms a strong adhesive bond between correction strip 11 and imaging strip 12 along the complete length of the bifunctional ribbon, which bond is in the center of the ribbon where it does not interfere with either the transfer operation of the imaging layer 18 or with the adhesive pick-off operation of the correction layer 15.

According to the preferred method for uniting the strips 11 and 12, the strips are aligned side-by-side with a marginal stripe of the undersurface of foundation 17 of strip 12 superposed on and overlapping a marginal stripe of the top surface of layer 15 of strip 11 to provide a central overlap area 13. The strips, retained in this relative position, are passed in the nip of a thin pressure roller or disc and a backing roller, the pressure roller or disc contacting either the surface of layer 18 or the back of foundation 14 and having a width corresponding to the width of the overlap 13, whereby the strips 11 and 12 are compressed only in area 13 to compress and activate the portion of layer 15 present in area 13 to form an adhesive stripe 16 which unites the strips 11 and 12 along their entire length. In some instances where the latent adhesive composition is also thermoplastic, it is preferred to heat the pressure roller or disc to the heat activation temperature of the adhesive composition.

The pressure of the pressure roller or disc may cause removal of a marginal strip of the imaging layer 12 overlying area 13 but this does not detract from the performance of the imaging layer since area 13 is remote from the area of either strip 11 or strip 12 which is contacted by the type face during use of the ribbon.

According to the preferred embodiment of the present invention, plastic films having different thicknesses are used as the foundations for the correction composition and for the carbon composition respectively. In such cases, the foundation for the correction composition is substantially thicker than the foundation for the carbon composition so that the pressure exerted by the type face against the correction-half of the ribbon will be cushioned by the foundation to provide a slightly broader area of contact between the adhesive correction layer and the image being removed from the copy sheet. This causes the adhesive correction composition to spread around the image in all directions so as to contact every visible portion of the image and insure that every trace of the image is lifted from the copy sheet when the correction ribbon is separated therefrom.

As for the carbon or imaging half of the ribbon, such a cushioning or broadening effect is to be avoided since it is most desirable that the carbon images transferred to the copy sheet should be as fine and sharp as possible, corresponding as closely as possible to the dimensions of the image present on the type face.

Preferably the film foundation for the correction composition has a thickness of from about 1 to 5 mils, most preferably about 2 mils, which equals 0.002 inch, while the film foundation for the carbon composition has a thickness of from about 0.25 to 1.5 mil, most preferably about ¾ mil, which equals 0.00075 inch. Generally the film foundation for the correction composition should be at least about 0.5 mil thicker than the film foundation for the carbon composition.

The films used for both foundations may be chemically the same or chemically different. Thus films of polyethylene terephthalate polyester, polypropylene, polyethylene, nylon, so-called "synthetic paper" plastic films, and the like, may be used with films which are chemically identical but differ from each other in thickness, within the ranges discussed supra. Also it is possible to use films which are chemically different, i.e. combinations of the films mentioned supra which also differ from each other with respect to thickness. For instance the foundation for the carbon composition may be polyethylene film having a thickness of 0.5 mil or 1 mil while the foundation for the correction composition may be a thicker polyethylene terephthalate polyester film having a thickness of 1.5 mils or 2 mils. If desired for additional strength and cut resistance, the film foundation used for either the carbon composition or for the correction composition, or for both, may be a laminate of any two of the aforementioned films either alike or different, bonded together by any suitable means such as a flexible intermediate resinous bonding layer. Such laminates are more resistant to shattering and breakage, under the effects of repeated type blows, than single unitary films.

Another factor which is important to the performance of the present bifunctional ribbons is the thickness of the carbon coating and the correction coating respectively. Generally the carbon coating should be substantially thinner than the correction layer, i.e. at least about 50% thinner, to provide sharp typed images. The carbon composition coating generally will have a thickness of from about 0.5 point to about 2 points, most preferably from about 0.75 point to 1.5 points, a point equaling 0.1 mil or 0.0001 inch. The correction composition coating generally will have a thickness of from about 3 to 15 points, most preferably from about 5 to 10 points, to provide a soft, pressure-adhesive layer of sufficient thickness to be pressed against and around the body of the image to be removed from the copy sheet.

Variations and modifications may be made within the scope of the claims and portions of the improvements may be used without others.

We claim:

1. A correction-imaging ribbon for use in pressure-imaging devices comprising (a) a first elongate strip of a flexible plastic film foundation having bonded to the front surface thereof a thin layer of a pressure-transferable imaging composition comprising synthetic resin binder material and coloring matter, and (b) a second elongate strip of a flexible plastic film foundation having bonded to the front surface thereof a latent adhesive layer which is substantially non-sticky to the touch but which becomes sticky under the effects of applied pressure, whereby an image formed on a copy sheet by typing aganist the back of said first elongate strip can be removed cleanly from said copy sheet by typing thereover against the back of said second elongate strip to cause the impressed area of said latent adhesive layer to stick to said image and pull it off the copy sheet, a marginal stripe of said latent adhesive layer of the second elongate strip being bonded directly to a marginal stripe of the rear surface of the plastic film foundation of the first elongate strip to provide a unitary correction-imaging ribbon.

2. A correction-imaging ribbon according to claim 1 in which the plastic film foundation of the second elongate strip is thicker than the plastic film foundation of the first elongate strip.

3. A correction-imaging ribbon according to claim 2 in which the foundation of the second elongate strip has a thickness of from about 1.0 to 5 mils and the foundation of the first elongate strip has a thickness of from about 0.25 mil to 1.5 mil, the foundation of the second strip being at least about 0.5 mil thicker than the foundation of the first strip.

4. A correction-imaging ribbon according to claim 1 in which the plastic film foundation of the first elongate strip comprises polyethylene.

5. A correction-imaging ribbon according to claim 1 in which the plastic film foundation of the second elongate strip comprises polyethylene terephthalate polyester.

6. A correction-imaging ribbon according to claim 1 in which said latent adhesive correction layer comprises a pressure-flowable adhesive resin and a non-adhesive surface material which renders the layer non-sticky to the touch in the absence of applied pressure.

7. A process for producing correction-imaging ribbons for use in pressure-imaging devices, comprising the steps of:

a. producing a first elongate strip by applying a thin layer of pressure-transferable imaging composition comprising synthetic resin binder material and coloring matter to a flexible plastic film foundation;

b. producing a second elongate strip by applying a latent adhesive correction layer to a flexible plastic film foundation, said layer being substantially non-adhesive to the touch but becoming sticky under the effects of applied presssure;

c. superposing said first elongate strip over said second elongate strip so that a marginal stripe of the film foundation of the first strip overlaps a marginal stripe of the latent adhesive layer of the second strip; and d. applying pressure against said overlapped marginal stripes to render the marginal stripe of the latent adhesive layer of the second elongate strip sticky and cause it to bond to the marginal stripe of the film foundation of the first elongate strip to form a unitary correction-imaging ribbon.

8. A process according to claim 7 in which the film foundation of the second elongate strip is thicker than the film foundation of the first elongate strip.

9. A process according to claim 7 in which the latent adhesive correction layer comprises a pressure-flowable adhesive resin and a non-adhesive surface material which renders the layer non-sticky to the touch in the absence of applied pressure.

10. A process according to claim 7 in which both heat and pressure are applied in step (d) to cause said elongate strips to bond together along said marginal stripes.

* * * * *